US008839441B2

(12) United States Patent
Saxena et al.

(10) Patent No.: US 8,839,441 B2
(45) Date of Patent: Sep. 16, 2014

(54) METHOD AND SYSTEM FOR ADAPTIVE VULNERABILITY SCANNING OF AN APPLICATION

(75) Inventors: Ashutosh Saxena, Gujarat (IN); Maneesh Ponnath, Karnataka (IN); Vishal Anjaiah Gujjary, Andhra Pradesh (IN)

(73) Assignee: Infosys Limited (IN)

( * ) Notice: Subject to any disclaimer, the term of this patent is extended or adjusted under 35 U.S.C. 154(b) by 463 days.

(21) Appl. No.: 12/858,884

(22) Filed: Aug. 18, 2010

(65) Prior Publication Data

US 2011/0321164 A1    Dec. 29, 2011

(30) Foreign Application Priority Data

Jun. 28, 2010   (IN) ........................... 1808/CHE/2010

(51) Int. Cl.
*G06F 11/00* (2006.01)
*G06F 21/57* (2013.01)

(52) U.S. Cl.
CPC .................................. *G06F 21/577* (2013.01)
USPC ........................................................... 726/25

(58) Field of Classification Search
CPC .... G06F 21/00; G06F 21/577; H04L 63/1433
USPC ..................................................... 726/22–25
See application file for complete search history.

(56) References Cited

U.S. PATENT DOCUMENTS

| 6,324,656 | B1 * | 11/2001 | Gleichauf et al. ............... 714/37 |
| 7,237,266 | B2 * | 6/2007 | Aaron .............................. 726/25 |
| 7,743,414 | B2 * | 6/2010 | Pouliot ............................ 726/22 |
| 7,779,468 | B1 * | 8/2010 | Magdych et al. ................ 726/22 |
| 7,913,303 | B1 * | 3/2011 | Rouland et al. .................. 726/23 |
| 7,975,306 | B2 * | 7/2011 | Chess et al. ...................... 726/25 |
| 2002/0066024 | A1 * | 5/2002 | Schmall et al. ............... 713/200 |
| 2004/0111638 | A1 * | 6/2004 | Yadav et al. ................... 713/201 |
| 2007/0157311 | A1 * | 7/2007 | Meier et al. ..................... 726/22 |
| 2008/0229415 | A1 * | 9/2008 | Kapoor et al. .................. 726/22 |
| 2009/0049547 | A1 * | 2/2009 | Fan ................................. 726/22 |
| 2009/0064334 | A1 * | 3/2009 | Holcomb ........................ 726/24 |
| 2009/0144827 | A1 * | 6/2009 | Peinado et al. ................. 726/25 |
| 2010/0299292 | A1 * | 11/2010 | Collazo ........................... 706/14 |
| 2011/0047620 | A1 * | 2/2011 | Mahaffey et al. ............... 726/23 |
| 2011/0145920 | A1 * | 6/2011 | Mahaffey et al. ............... 726/22 |
| 2011/0162072 | A1 * | 6/2011 | Hay et al. ........................ 726/25 |

(Continued)

OTHER PUBLICATIONS

Tevis, Jay-Evan et al., Methods for the Prevention, Detection and Removal of Software Security Vulnerabilities, 2004 ACM Southeast Conference '04, pp. 197-202.*

*Primary Examiner* — Jeffrey Pwu
*Assistant Examiner* — Carlos Amorin
(74) *Attorney, Agent, or Firm* — Cantor Colburn LLP

(57) ABSTRACT

A method and system for adaptive vulnerability scanning (AVS) of an application is provided. The adaptive vulnerability scanning of an application assists in identifying new vulnerabilities dynamically. The endpoints of an application are scanned using a predefined set of rules. Subsequently, one or more possible vulnerabilities are presented. The vulnerabilities are analyzed and predefined rules are modified. The steps of scanning the application and modification of rules are iteratively repeated till the adaptive vulnerability scanning capability is achieved. A neural network is used for training the adaptive vulnerability scanner. This neural network is made to learn some rules based on predefined set of rules while undergoing the training phase. At least one weight in neural networks is altered while imparting the self learning capability.

15 Claims, 10 Drawing Sheets

(56) References Cited

U.S. PATENT DOCUMENTS

2011/0191854 A1* 8/2011 Giakouminakis et al. ...... 726/25
2011/0225650 A1* 9/2011 Margolies et al. .............. 726/22
2011/0231936 A1* 9/2011 Williams et al. ................ 726/25
2012/0185945 A1* 7/2012 Andres et al. ................... 726/25
2012/0198553 A1* 8/2012 Suginaka et al. ............... 726/24
2012/0260344 A1* 10/2012 Maor et al. ...................... 726/25

* cited by examiner

METHOD AND SYSTEM FOR ADAPTIVE VULNERABILITY SCANNING OF AN APPLICATION

TECHNICAL FIELD

The present technique relates to a method and system for identification of possible vulnerabilities in an application. More particularly, the present technique relates to an adaptive vulnerability scanning of an application using a neural network.

BACKGROUND

Presently, one of the key challenges that software developers face is in identifying whether or not the application they develop has vulnerabilities that can compromise the application's functionality or data. The growing number of threat vectors makes it difficult for them to comprehensively identify all the issues. The number of rules that needs to be run is enormously huge and this makes it is literally impossible to run them manually. The obvious option then is to automate these tests. However automation has its own set of drawbacks resulting in a lot of false positives and false negatives. Other drawbacks include differences in vulnerabilities across applications, differences in symptoms in each application exhibits for the same vulnerability and also the differences in techniques used to identify the same kind of vulnerability in different applications. On the other hand, these false positives and false negatives, of automated tests, can be eliminated if the tests are carried out by a security expert manually. The security expert, carrying out the tests manually, learns from his experience and can then devise rules and analyze results and adapt to different behavior patterns. But then manual tests come with the inherent disadvantage of being too slow and are prone to human errors due to oversight.

Therefore, it may be desirable to provide a technique to identify new vulnerabilities faster and in more accurate manner.

SUMMARY

According to one aspect of the present technique, a method for adaptive vulnerability scanning is provided. The method comprises scanning at least one application for at least one vulnerability by executing a predefined set of rules for a scanner, analyzing the vulnerabilities of the application presented after the scanning, modifying the predefined set of rules based on the analyzed vulnerabilities, and training the scanner for adaptive vulnerability scanning. The adaptive vulnerability scanning method uses neural networks to capture the properties of different vulnerabilities along with those that may not be observed earlier. On actuation, the adaptive vulnerability scanner is trained and it is capable of identifying the new vulnerabilities for an application and presents a report of it thereof. Thus, the adaptive vulnerability scanner reduces the overall time required to scan a given application.

According to one aspect of the present technique, a system for adaptive vulnerability scanner is provided. The scanner comprises a scanning module configured to scan at least one application for at least one vulnerability by executing a predefined set of rules for a scanner, a vulnerability analysis module configured to analyze the vulnerabilities of the application presented after the scanning, a modifying module configured to modify the predefined set of rules based on the analyzed vulnerabilities, and a training module configured to train the scanner for adaptive vulnerability scanning. Additionally, a reporting module is configured to generate a report of all the possible vulnerabilities. The adaptive vulnerability scanner uses neural networks to capture the properties of different vulnerabilities along with those that may not be observed earlier. On actuation, the adaptive vulnerability scanner is capable of identifying new vulnerabilities for an application and presents a report of it thereof. Thus, the adaptive vulnerability scanner reduces the overall time required to scan a given application.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE EXEMPLARY EMBODIMENT

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

The present technique relates generally to provide an adaptive vulnerability scanning for an application.

Figure 1:
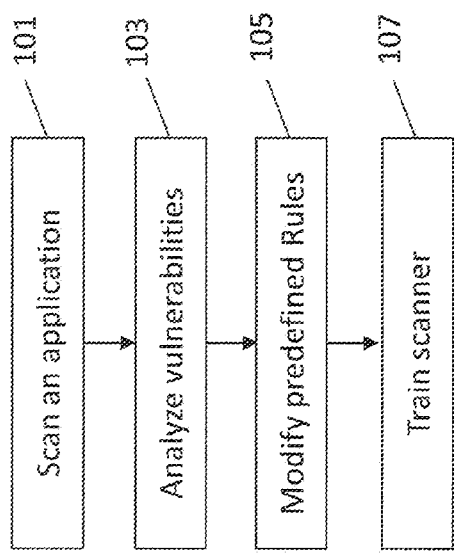
FIG. 1 is a flowchart illustrating a training process of an adaptive vulnerability scanner of the present technique, according to one embodiment of the present technique.

FIG. 1 is a flowchart illustrating a training process of an adaptive vulnerability scanner of the present technique, according to one embodiment of the present technique. The method starts with scanning an application using a predefined set of rules as represented in step 101. The application can be a software application, a component of a software application, a source code and the like. The predefined set of rules is any known set of rules that are executed to identify possible vulnerabilities in an application. While scanning the application, one or more of errors in the form of vulnerabilities is generated. These errors are accumulated for analyzing of vulnerability of the application and training of the neural network thereof. Also, for an application, a list of expected errors, also known as "original errors" or "original list of errors" is stored in a memory. The vulnerability in an application may relate to the application's functionality, data and the like.

In step 103, the vulnerabilities identified during scanning in step 101 are analyzed. The analysis of vulnerabilities includes providing a list of vulnerabilities, comparing the list with the original list of vulnerabilities of the application and deviation scope of vulnerabilities. The deviation scope defines whether the generated vulnerabilities are negligible. Based on the vulnerability analysis, the set of predefined rules is modified and fed into the neural network. The modification of rules involves a change in weight of the rules. The modified rules are further executed on the application to identify vulnerabilities that may not be observed in the previous scanning as represented by step 105. The rules are modified for at least once so that the neural network adapts itself to identify previously unknown vulnerabilities. The neural network is used to train the scanner as represented in step 107. The value of weights in the neural network is continuously modified till the adaptive capability is achieved. The process of modifying the weights is described in FIG. 2.

According to one embodiment of present technique, the training of neural network is a one time process that can be performed offline. For those skilled in the art, the training can also be provided in run-time and is within the scope of the present technique. According to one another embodiment of the present technique, a report containing a list of vulnerabilities is presented. The list of vulnerabilities is used for training the neural network.

Figure 2:
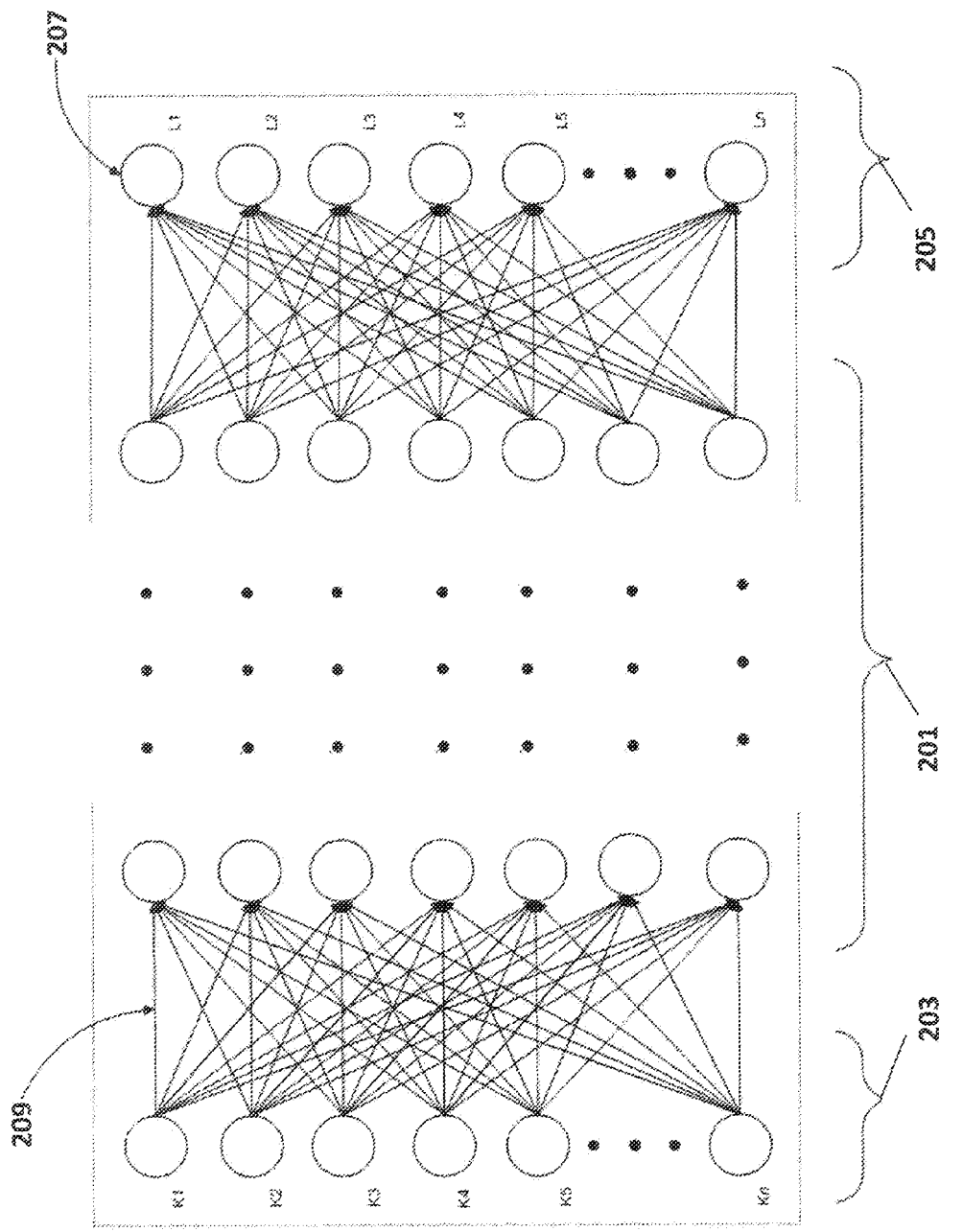
FIG. 2 is a diagram showing components of Artificial Neural Network (ANN), according to one embodiment of the present technique.

FIG. 2 is a diagram showing an artificial neural network (ANN), according to one embodiment of the present invention. For example, the artificial neural network comprises three layers viz., input layer 203, hidden layer 201, and output layer 205. Each of these layers contains multiple numbers of nodes 207. The input layer 203 accepts the data being processed, the hidden layer 201 processes the data and the output layer 205 presents the processed data. Typically, the nodes of input layer 203, hidden layer 201 and output layer 205 are fully connected to immediate layer of each other. For instance, each node of input layer 203 will have a weighted connection 209 to each node of hidden layer 201. Similarly, each node of hidden layer 201 will have a weighted connection to each node of output layer 207.

According to one embodiment of the present technique, processing of data in the neural network works involves propagation of input forward from the input layer 203 through the hidden layer 201 and finally through the output layer 205 to produce a response. Each node, regardless of the layer it is in, uses the same transfer function in order to propagate its information forward to the next layer.

Additionally, training of the neural network involves following components:
1. Network type: it determines the appropriate network architecture.
2. Test data: It defines a data set that will be used for training the neural network for scanning an application for possible vulnerabilities.
3. Rules to be followed: it defines the neural network parameters to be used for training.
4. Training: It defines training of the neural network. As appreciating by the people skilled in the art, the training of neural network involves creating the topology and then setting the weights of each link and threshold. Also, as known to the people skilled in the art, training of neural network is trial & error basis. If the network isn't behaving the way it should, change the weighting of a random link by a random amount.
5. Quality Check: It defines testing of the trained network i.e., whether the output of neural network is matching the desired results. Training of neural network is purely a trial and error basis. If the neural network is not behaving the desired way, weights of link is changed by random value.
6. Analysis of Training: Analyze the results to obtain efficiency training analysis.

Figure 3A:
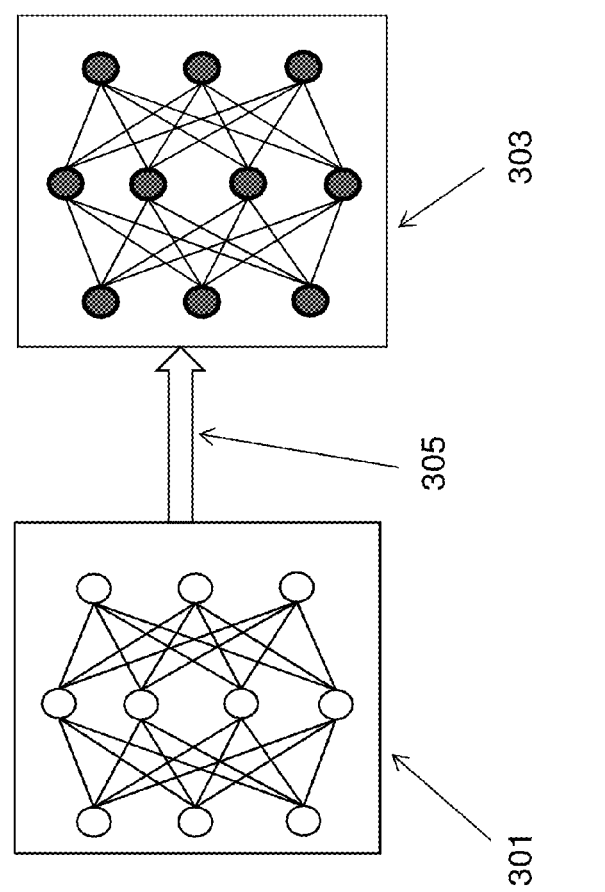
FIG. 3A is a diagram showing transformation of a nascent neural network into a weighted neural network during the training of the neural network, according to one embodiment of the present technique.

FIG. 3A is a diagram showing transformation of a nascent neural network 301 to a weighted neural network 303 during the training 305 of the neural network, according to one embodiment of the present technique. At the initial stage, the neural network weights are initialized either to zero or any random number. After training the weights get adjusted accordingly and the trained neural network can be passed on to the next stage. The process of training 305 the neural network is explained in described in FIG. 3B.

Figure 3B:
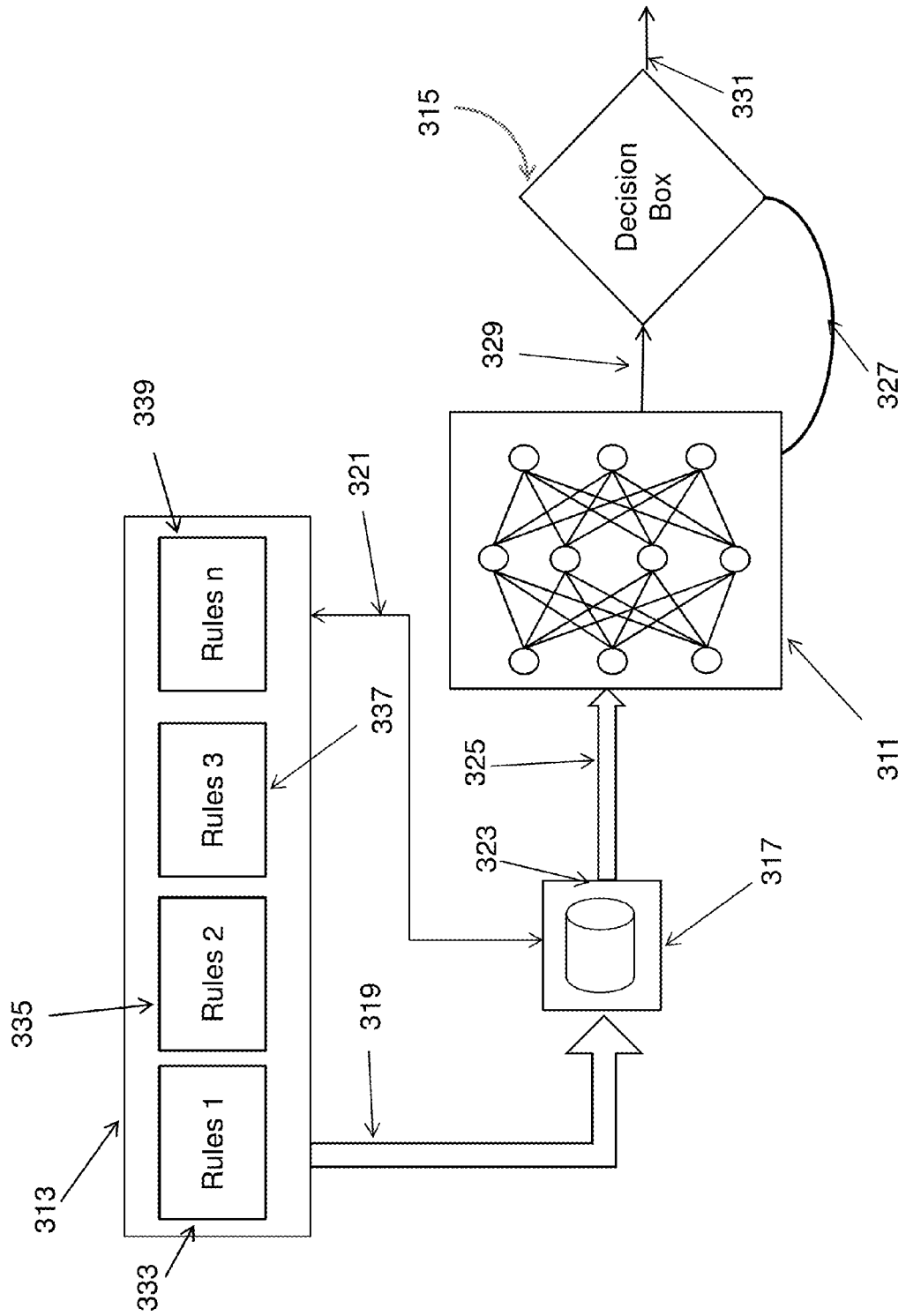
FIG. 3B is a diagram representing the training phases of the neural network used in vulnerability scanning, according to one embodiment of the present technique.

FIG. 3B is a diagram representing the training phases of the neural network used in vulnerability scanning, according to one embodiment of the present technique. During training, all the instances in a schema 313 are considered. A schema set consists of different vulnerabilities with different representations and with different properties. The way a neural network is trained, is governed by the rules derived from the representation of vulnerabilities in schema 313. Schema 313 consists of an exemplary list of rules, but not limited to, that could be applied as part of vulnerability scanning. Each of Rule1 (block 333), Rule2 (block 335), Rule3 (block 337) . . . Rule n (block 339) represent different rules. Each rule corresponds to representation of a node (one particular type of vulnerability) in the schema. Based on the schema 313, examples are formed and are fed to the neural network through 319. The schema, which is in a metadata format, cannot be directly fed to the neural network. Hence, a binary converter 317 is used to convert the metadata to a binary format wherein the neural network is able to understand the binary format of the metadata. The secondary information about the metadata assists in formulating the binary conversion. If the secondary information is not converted into the binary format, the secondary information is forwarded to 317 to convert the secondary information into the binary format as represented by 321. Subsequently, the binary converter selects the errors that are of similar nature and the error of similar nature is represented by a close binary value. Afterwards, a numeric differentiation between error input and output is established. The numeric differentiation between error inputs and the output is able to accommodate any vulnerability that may not have been observed previously. The process 323 represents the extraction of binary data and feeding to the neural network 311 through 325 in the form of an input vector wherein the converted binary data is an input vector for neural network 311. Based on the weights of the input vector at that instant, the neural network generates the output vector. The output vector generated by the neural network and the expected output are compared as represented by block 315 wherein the output vector is presented through 329. On comparison, if there is no deviation observed between the output vector and the expected output, it is assumed that the network has learnt the corresponding pattern. Otherwise, the deviation is reflected in block 315, the deviation value is redirected to the neural network as represented by path 327. On redirection of the deviation value to neural network 311, weights of nodes are changed accordingly. The step comparison in block 315 and redirecting the deviation value through 327 is repeated till the network learns the rules with which it is presented.

The training of neural network 311 is a one time process and it can be performed offline or in real-time. In offline training of the neural network, the exemplary sets of rules are provided and the weights of nodes for the neural network are changed accordingly wherein the method of changing the weights and training the neural network is explained previously.

Figure 4:
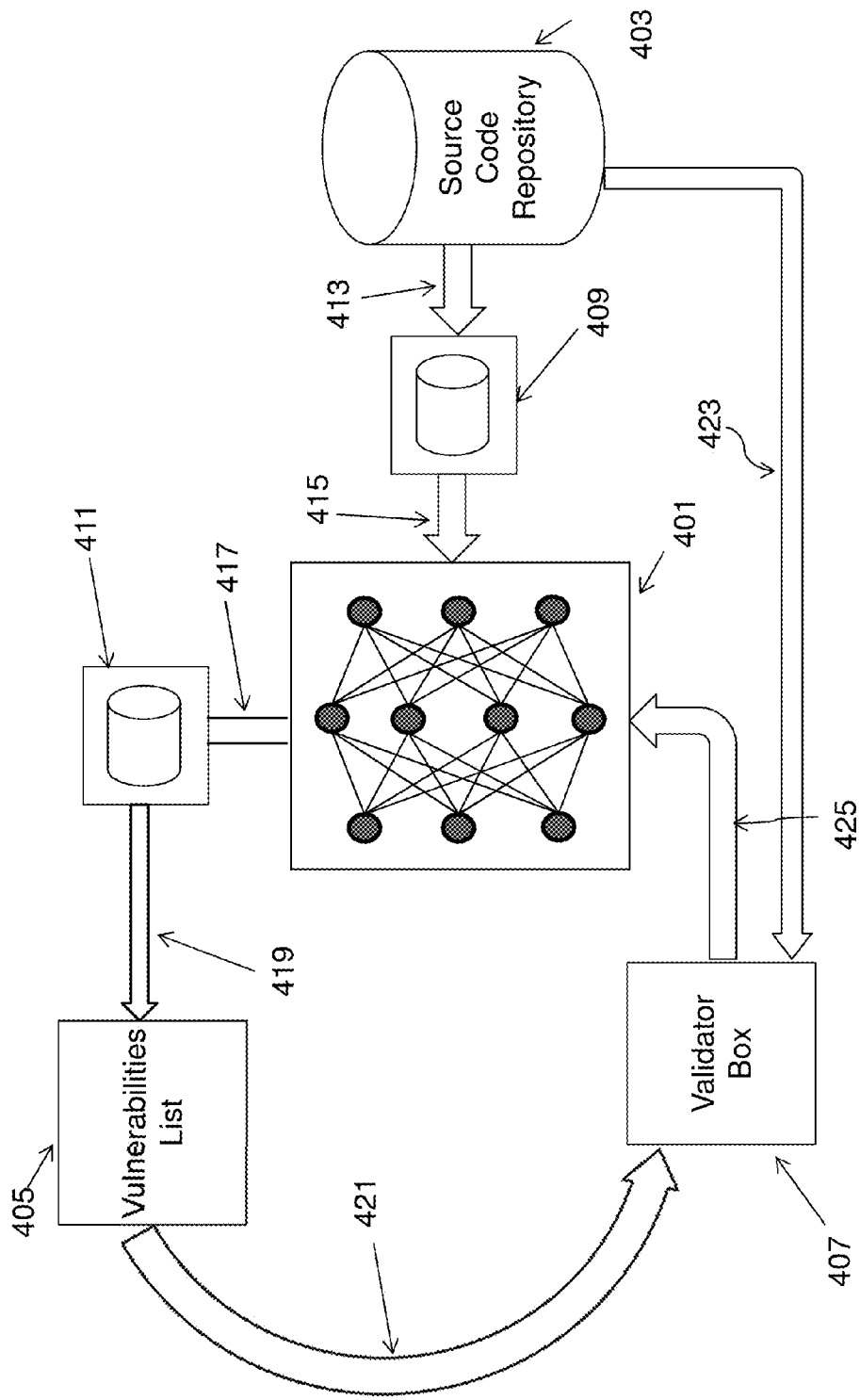
FIG. 4 is a diagram illustrating the adaptive nature of the neural network, according to one embodiment of the present technique.

FIG. 4 is a diagram illustrating the adaptive nature of the neural network, according to one embodiment of the present technique. An adaptive neural network acclimatizes to any new data environment and automatically updates itself with the new learning. Further, the adaptive neural network can be used as a hard coded segment for scanning any new application. Additionally, the present adaptive neural network also addresses the drawbacks that affect the classical vulnerability scanners. If a noisy data is given as input or a new vulnerability has to be detected, the validator box 304 identifies such instances and assists the neural network learn the new rules.

Given a trained neural network 401 imbibed with the properties of vulnerabilities and an application 403 that has to be scanned for vulnerabilities, an adaptive neural network is generated. The input to the present system is an application 403 that may contain possible vulnerabilities. Before inputting application 403 as a schema to the neural network, it has to be converted to a binary format. This is done by passing the schema through 413 to a binary converter 409. Now the schema is presented in a binary format that neural network 401 can understand i.e., the binary format of the data becomes an input for neural network (NN) 401. This input is fed to the NN 401 through 415. The trained NN 401 is used to generate a vulnerability list from the schema in the binary format. The binary format of the vulnerabilities is again passed through binary converter 411, which converts the binary data into a vulnerability list. This is the intermediate vulnerability list and needs to be improved. The contents of the list are local to the application that is scanned. Hence NN 401 needs to be updated or imbibed with the characteristics that are specific to the application on which it will be used. The vulnerability list thus generated will be passed through the channel 421 for cross-checking with the help of validator 407. It should be noted that validator 407 will have learnt the semantics of the rules during training phase. Hence the vulnerability list is re-checked and necessary modifications are made. If this process doesn't help the NN 401 learn, then the input-output pair is modified with the help of schema of the application through 423, depicting a rule and fed to the network through 425. When such a pair is fed to the network, corresponding weights in the neural network are changed accordingly. Thus, this process makes the neural network adaptive to any vulnerability.

Figure 5:
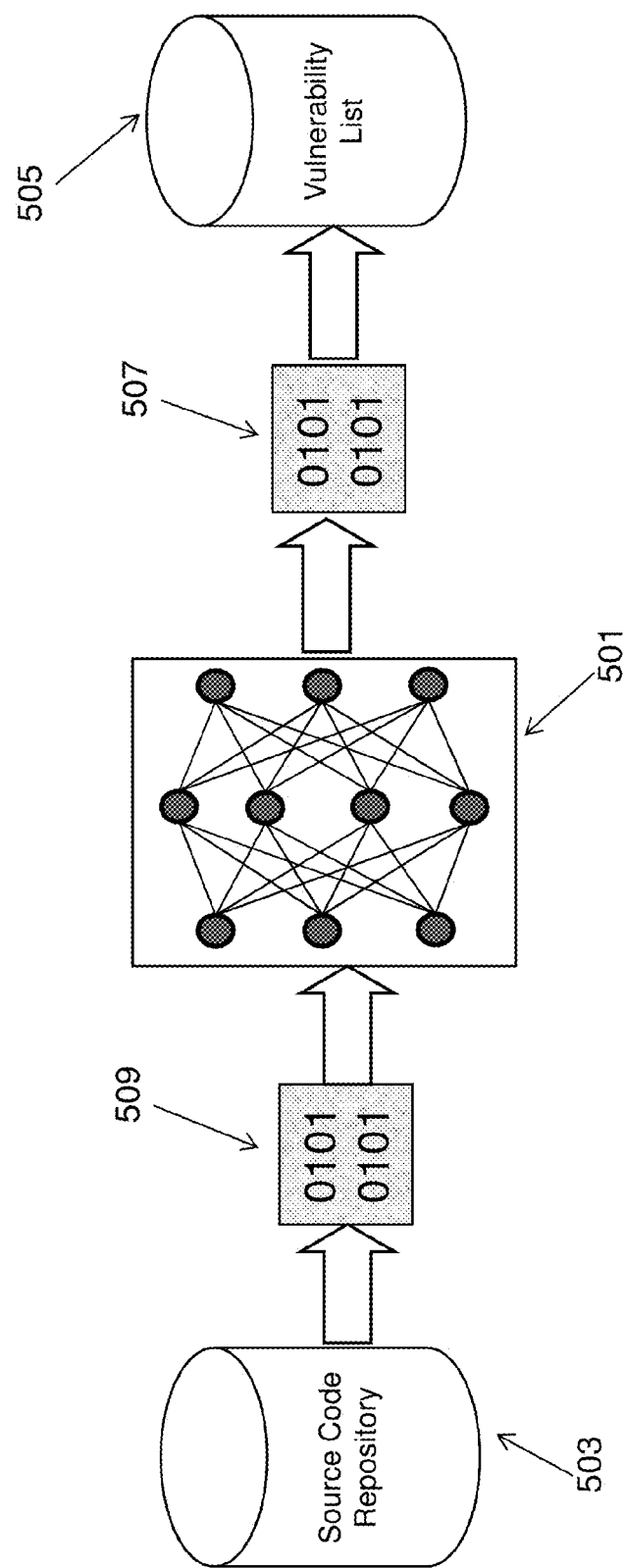
FIG. 5 is a diagram depicting generation of a vulnerability list, according to one embodiment of the present technique.

FIG. 5 is a diagram depicting generation of a vulnerability list, according to one embodiment of the present technique. The adaptive neural network 501 is used to generate a vulnerability list 505, wherein the schema for training for the source code 503 is provided. Here the schema is different from what is used for training the neural network. However, it is based on the properties of the metadata that is used for training. The schema is converted into binary format before it is fed into the neural network. The output of the neural network is again in a binary format and is converted into the list of vulnerabilities 505 using the binary converter 507. In other words, the schema in binary format which forms an input vector is fed to the adaptive neural network through 509 and it produces the vulnerability list in binary format 507 too. The output in the binary format is now fed to the reverse-binary converter 507, which produces the vulnerability list. This network now can be used for testing since the neural network here is already adaptive, there will be no error in generating the final desired vulnerabilities list.

Figure 6:
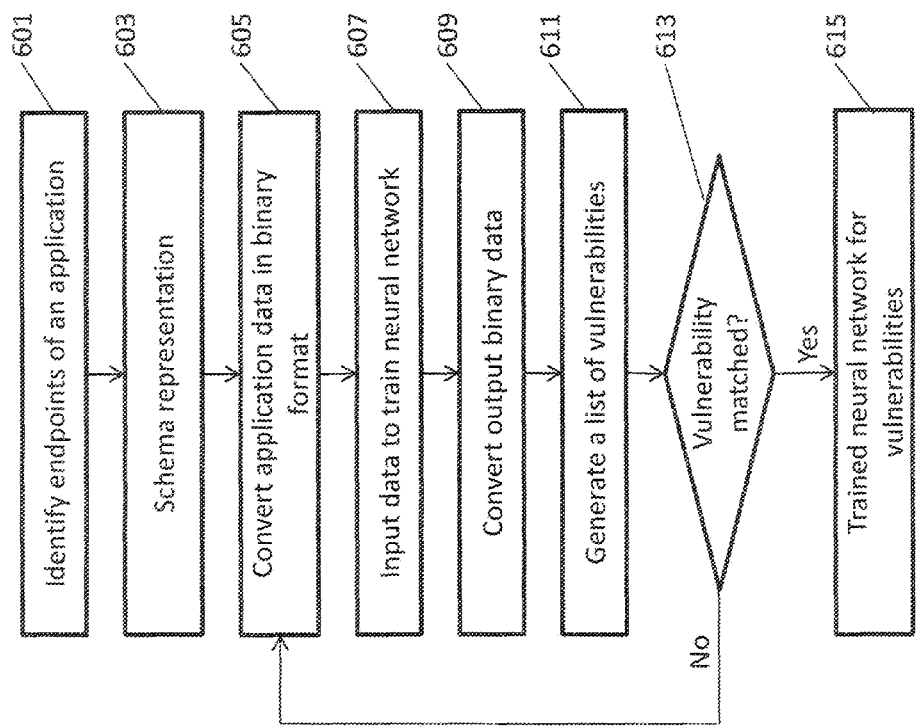
FIG. 6 is a flowchart illustrating the different stages involved in vulnerability scanning, according to one embodiment of the present technique.

FIG. 6 is a flowchart illustrating the different stages involved in vulnerability scanning, according to one technique of the present technique. For an application, endpoints of the application are identified as represented by step 601. An application comprises multiple endpoints. The endpoints define communication between applications. The schema representation helps mine the application data and represent it in a compact form. Moreover, such representation is helpful for neural network training too by forming an input-output pair. For example, if the vulnerability scanning is stated to perform for the following codes:

```
<Vulnerability>
<SQLInjection>
<input name="generic" value="%27where">
<code status="500" default="Alert" desc="Alert Generic">
  <condition type="Pattern" exp="token *\n* *unknown" />
  <condition type="Pattern" exp="sql *\n* *((exception)|(error))" />
  <condition type="Pattern" exp="((odbc)|(jdbc))
*\n* *((exception)|(error))" />
  <condition type="Pattern" exp="ODBC Microsoft Access Driver" />
  </code>
<code status="404" default="Alert:validation" desc="Alert-input
validation not done" />
<code status="200" default="Alert:Exception" desc="Exception/Error">
  <condition type="Pattern" exp="sql *\n* *((exception)|(error))" />
  <condition type="Pattern" exp="token *\n* *unknown" />
  <condition type="Pattern" exp="syntax *\n* *error" />
  </code>
  </input>
</SQLInjection>
</Vulnerability>
```

The possible input to the neural network would be the input name and the input value. The input name defines the category of the input i.e., "generic", "generic-1" and so on. The input value is the input given to the application i.e., "%27where", "where", for the input name.

The expected output from the neural network is exemplified below:
1. Code status represents the code for the error of the application i.e., for code status 500, the default value is "alert" and the description of the error is "alert generic". Similarly for code status 404, the default value is "alert: validation" and the description of the error is "Alert-input validation not done".
2. An expression that includes all the possible error statements. Values: "token *\n* *unknown" . . . .

So the schema of representation would be as follows:

Input: (input: name, input: value)
Output: (code status, default, desc, condition type, exp)
An example of schema: // tuple format for the input and output values;
Input: ("generic","%27where")
Output: ("500","Alert","Alert Generic","pattern","token *\n* *unknown")

Each of the entries for both the input and output can be represented in the binary format. It is assumed that there would be no more than 32 different types of input names; therefore 5 bits ($2^5=32$) would be enough to represent all kinds of inputs.

The input values of schema representation 603 are converted into the binary format 605 using a binary converter. The representation of input values in binary format is provided in Table 1.

TABLE 1

| Input Value | Representation in Binary format |
| --- | --- |
| Generic | 00000 |
| Generic-1 | 00001 |
| Having-value | 00010 |
| Blind-true | 00011 |
| . . . | . . . |
| . . . | . . . |

The input value in binary format is fed into the neural network. The binary format of input value is used to train the neural network as defined FIG. 3B. A similar approach may be followed for other kinds of input and output values. Hence an input-output pair for the below example would look like:

<input name="generic" value="%27where">
<code status="500" default="Alert" desc="Alert Generic">
<condition type="Pattern" exp="token *\n* *unknown" />
Input: (00000, 00010)
Output: (010, 0001, 011, 01, 0101)
Input String: 0000000010
Output String: 0100001011010101

The number of bits for each value would depend on the possible entries for that value.

The weights of the neural network are re-arranged and this is done till the output generated by the neural network and the expected output value are very close or the deviation is acceptable. So when a new input is given, a corresponding output is generated in a binary format. This output in the binary format is converted back in one of the possible vulnerabilities and a list of vulnerabilities is generated as represented by step 611. The vulnerability from the generated list of vulnerabilities 611 is compared with vulnerability is provided in the original list of vulnerabilities. If the vulnerabilities from the generated list match with the original list of vulnerabilities, the neural network is assumed to be trained, otherwise the generated list of vulnerabilities is not the final list of vulnerabilities. To increase the performance and to be more accurate at the results, the vulnerability list is sent to the validator box in block 609.

Figure 7:
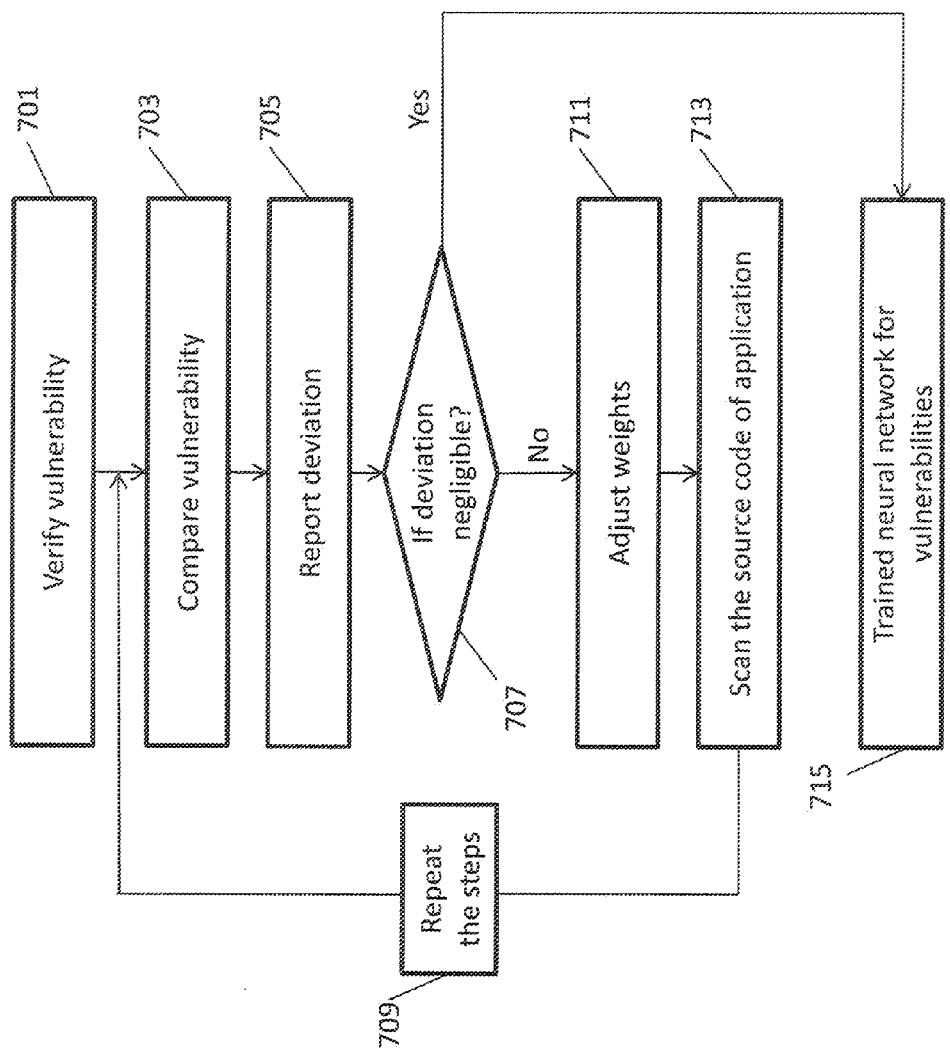
FIG. 7 is a flowchart illustrating a method for validation of vulnerabilities, according to one embodiment of the present technique.

FIG. 7 is a flowchart illustrating a method of the validation of vulnerabilities according to one embodiment of the present technique. The validation of vulnerability assists in developing the adaptive vulnerability scanner. The validation process starts with verifying the vulnerabilities wherein the pattern of vulnerabilities are defined as represented by step 701. The pattern of vulnerabilities has the knowledge of the schema associated with different vulnerabilities found in an application. In step 703, comparison of a verified vulnerability and the original vulnerability is performed. The properties and characteristics of vulnerabilities in the original list are provided and properties and characteristics of verified vulnerabilities of the list are obtained. The properties and characteristics of vulnerability in the original list and the verified list are compared and a report of deviations between properties of characteristics of vulnerabilities the original list and the verified list is presented as indicated by step 705. The performance of the neural network is analyzed based on the comparison.

In step 707, the deviation value, presented in block 705, is analyzed. If the deviation value is negligible, then the present vulnerability list is considered to be the final output and the list of vulnerabilities is considered as the final list as shown in block 715. However, if the deviation value is not negligible, the weight of the neural network is adjusted as displayed by block 711. With the updated neural network, scanning of vulnerabilities is performed and the intermediate vulnerability list is generated as indicated in block 713. The updated intermediate list is redirected to the block 703 for comparison with the expected final list. This cycle is repeated until the neural network attains the adaptive nature.

It is to be understood that the exemplary embodiments is merely illustrative of the present invention and that many variations of the above-described embodiment and example can be devised by one skilled in the art without departing from the scope of the invention. It is therefore intended that all such variations be included within the scope of the following claims and their equivalents.

Figure 8:
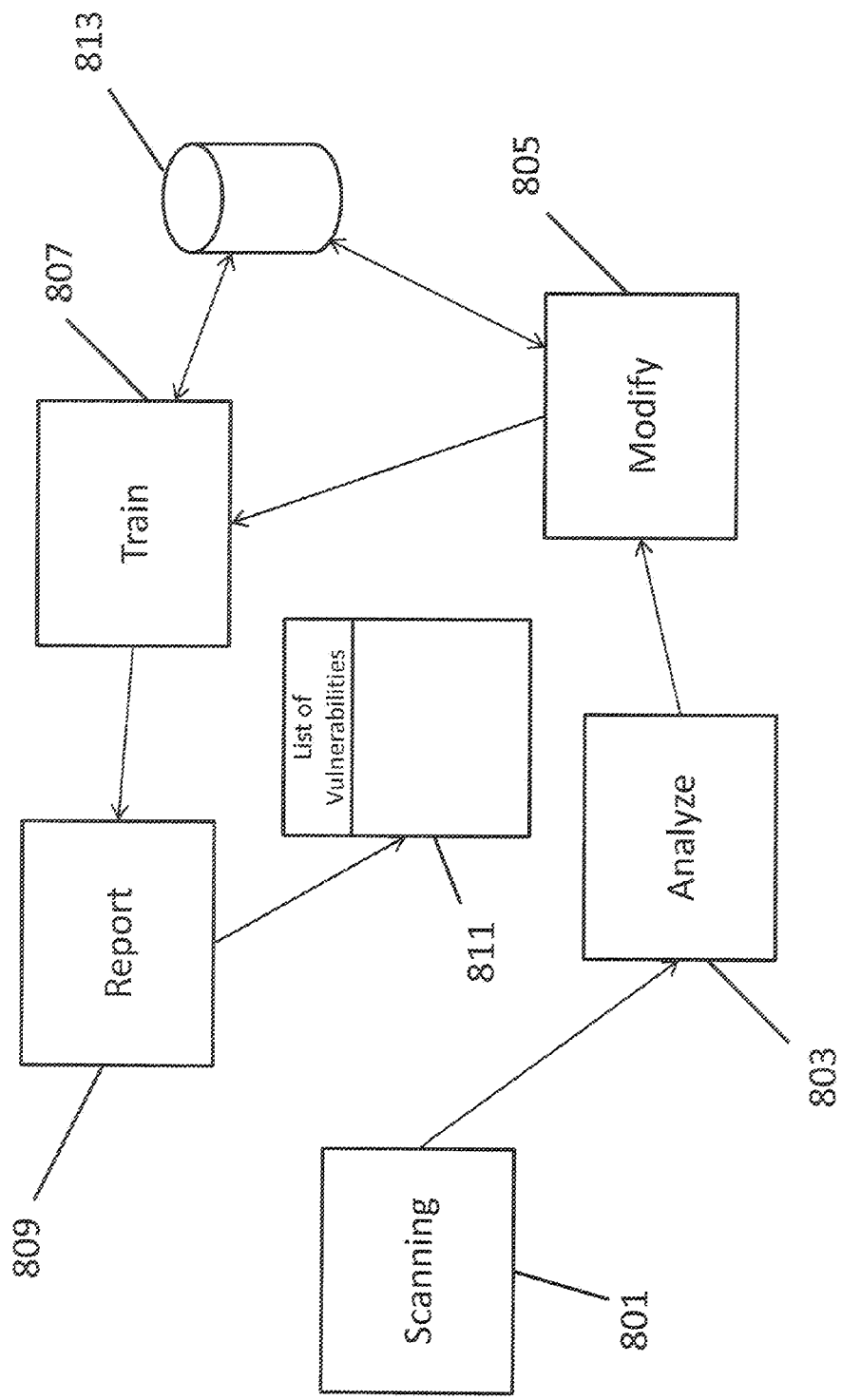
FIG. 8 is a system block diagram showing components of an adaptive vulnerability scanner, according to one embodiment of the present technique.

FIG. 8 is a system block diagram showing components of adaptive vulnerability scanner, according to one embodiment of the present technique. The major components of adaptive vulnerability scanner comprise a scanning module 801, an analyzing module 803, a modifying module 805, a training module 807, a reporting module 809, and a storage module 813. The scanning module 801 scans through an application for one or more vulnerabilities using a predefined set of rules. The analyzing module 803 analyzes the vulnerability. The analysis of vulnerabilities includes presenting a list of errors, comparison with original list of errors of the application and deviation scope of errors. The deviation scope defines whether the generated errors are negligible. Based on a vulnerability analysis performed by the analysis module 803, a modifying module 805 is used to modify the predefined rules. The modifying of rules involves changing one or more weights in the neural network. A storage module 813 comprises a list of possible vulnerabilities (also refer as original vulnerability) to compare with the generated list of vulnerabilities. The comparison of original vulnerability and generated vulnerability assists in training the adaptive vulnerability scanner. A training module 807 governs training of adaptive vulnerability scanner. Based on comparison of vulnerabilities, a decision on training of adaptive vulnerability is taken. A neural network is used for training adaptive vulnerability scanner. A negligible deviation implies that the neural network has been trained to identify new vulnerability while a marginal deviation implies that the weighs in neural network should be modified. Additionally, a reporting module 809 generates a list of vulnerabilities. The generated list of vulnerabilities is compared with the original list of vulnerabilities while training the adaptive vulnerability scanner.

Exemplary Computing Environment

Figure 9:
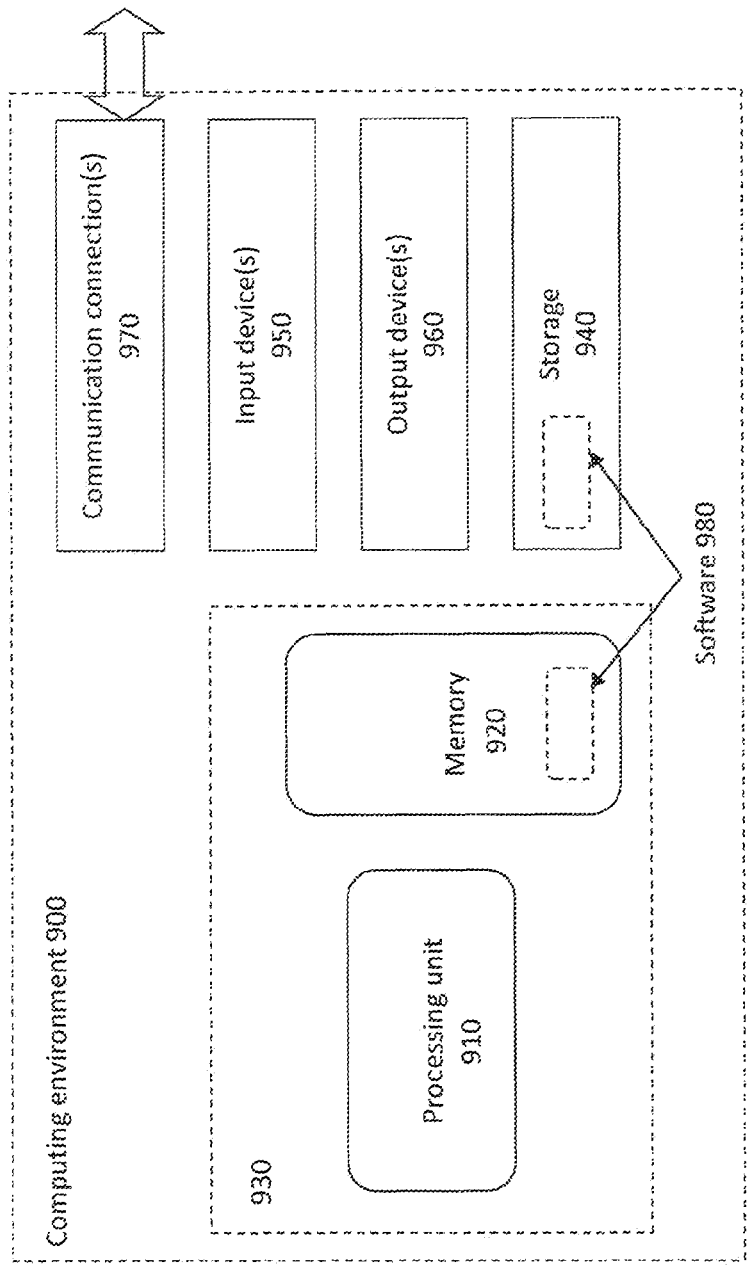
FIG. 9 is a system illustrating a generalized computer network arrangement, in one embodiment of the present technique.

One or more of the above-described techniques can be implemented in or involve one or more computer systems. FIG. 9 illustrates a generalized example of a computing environment 900. The computing environment 900 is not intended to suggest any limitation as to scope of use or functionality of described embodiments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. In some embodiments, the memory 920 stores software 980 implementing described techniques.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. In some embodiments, the storage 940 stores instructions for the software 980.

The input device(s) 950 may be a touch input device such as a keyboard, mouse, pen, trackball, touch screen, or game controller, a voice input device, a scanning device, a digital camera, or another device that provides input to the computing environment 900. The output device(s) 960 may be a display, printer, speaker, or another device that provides output from the computing environment 900.

The communication connection(s) 970 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 900, computer-readable media include memory 920, storage 940, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

The invention claimed is:

1. A computer implemented method for adaptively training a scanner offline using a trained neural network for scanning vulnerability in a software application, the method comprising:
    converting at least one software application into binary format data;
    providing the binary format data of the at least one software application as an input to the trained neural network;
    scanning the binary format data of the at least one software application using the trained neural network for identifying at least one vulnerability by executing a predefined set of rules for the scanner, each of the predefined set of rules being represented as a different node of the trained neural network, wherein the predefined set of rules is derived based on a predefined set of vulnerabilities associated with one or more software applications;
    analyzing the identified at least one vulnerability of the at least one software application presented after the scanning, wherein the analyzing comprises comparing the identified at least one vulnerability of the at least one software application with an original set of vulnerabilities associated with the at least one software application;
    modifying the predefined set of rules by adjusting one or more weights of nodes of the trained neural network if the identified at least one vulnerability of the at least one software application does not match with the original set of vulnerabilities associated with the at least one software application;
    repeating the steps of scanning, analyzing, and modifying until the identified at least one vulnerability in the at least one software application match with the original set of vulnerabilities; and
    training the scanner with the modified predefined set of rules for scanning another software application to identify one or more vulnerabilities after the at least one vulnerability is matched with the original set of vulnerabilities.

2. The method of claim 1, wherein a neural network is used for training the scanner.

3. The method of claim 1, wherein modifying the predefined set of rules comprises changing at least one value of the predefined set of rules.

4. The method of claim 1 further comprising:
    identifying at least one endpoint of the at least one software application.

5. The method of claim 1 further comprising:
    generating at least one report of the at least one vulnerability.

6. A system for adaptively training a scanner for vulnerability scanning in a software application, the system comprising:

a memory comprising program instructions;

a processor configured to execute the program instructions stored in the memory;

a scanning module in communication with the processor and configured to scan binary format data of at least one software application using the trained neural network for identifying at least one vulnerability by executing a predefined set of rules for the scanner, each of the predefined set of rules being represented as a different node of the trained neural network, wherein the predefined set of rules is derived based on a predefined set of vulnerabilities associated with one or more software applications, and further wherein the binary format data is obtained from the at least one software application;

a vulnerability analysis module in communication with the processor and configured to analyze the identified at least one vulnerability of the at least one software application presented after the scanning, wherein the analyzing comprises comparing the identified at least one vulnerability of the software application with an original set of vulnerabilities associated with the at least one software application;

a modifying module in communication with the processor and configured to modify the predefined set of rules by adjusting one or more weights of nodes of the trained neural network if the identified at least one vulnerability of the at least one software application does not match with the original set of vulnerabilities associated with the at least one software application, wherein the scanning, the analyzing, and the modification of the predefined set of rules are repetitively performed until all vulnerabilities in the at least one software application match with the original set of vulnerabilities; and a training module in communication with the processor and configured to train the scanner with the modified predefined set of rules for scanning another software application to identify one or more vulnerabilities after the at least vulnerability is matched with the original set of vulnerabilities.

7. The system of claim 6, further comprising: a neural network which is used for training the scanner.

8. The system of claim 6, wherein the modifying module is configured to modify at least one value of the predefined set of rules.

9. The system of claim 6 further comprising: an identifying module, in communication with the processor and configured to identify one or more endpoints of the at least one software application.

10. The system of claim 6 further comprising: a generating module, in communication with the processor and configured to generate at least one report of the at least one vulnerability.

11. A computer program product comprising a non-transitory computer usable medium having a computer readable program code embodied therein for adaptively training a scanner offline using a trained neural network for scanning vulnerability in a software application, the computer program product comprising:

a program code adapted for converting at least one software application into binary format data;

a program code adapted for providing the binary format data of the at least one software application as an input to the trained neural network;

a program code adapted for scanning the binary format data of the at least one software application using the trained neural network for identifying at least one vulnerability by executing a predefined set of rules for the scanner, each of the predefined set of rules being represented as a different node of the trained neural network, wherein the predefined set of rules is derived based on a predefined set of vulnerabilities associated with one or more software applications;

a program code adapted for analyzing the identified at least one vulnerability of the at least one software application presented after the scanning, wherein the analyzing comprises comparing the identified at least one vulnerability of the at least one software application with an original set of vulnerabilities associated with the at least one software application;

a program code adapted for modifying the predefined set of rules by adjusting one or more weights of nodes of the trained neural network if the identified at least one vulnerability of the at least one software application does not match with the original set of vulnerabilities associated with the at least one software application, wherein the scanning, the analyzing, and the modification of the predefined set of rules are performed until all vulnerabilities in the at least one software application match with the original set of vulnerabilities; and a program code adapted for training the scanner with the modified predefined set of rules for scanning another software application to identify one or more vulnerabilities after the at least one vulnerability is matched with the predefined set of vulnerabilities.

12. The computer program product of claim 11, wherein the program code is adapted for training further comprises a program code for training a neural network being used for training the scanner.

13. The computer program product of claim 11, wherein the program code adapted for modifying further comprises a program code adapted for modifying at least one value of the predefined set of rules.

14. The computer program product of claim 11 further comprising: a program code adapted for identifying at least one endpoint of the at least one software application.

15. The computer program product of claim 11 further comprising: a program code adapted for generating at least one report of the at least one vulnerability.

* * * * *